United States Patent
Okajima et al.

(10) Patent No.: US 7,666,489 B2
(45) Date of Patent: Feb. 23, 2010

(54) WEATHER STRIP AND METHOD FOR MANUFACTURING THE SAME

(75) Inventors: Kurato Okajima, Aichi-ken (JP); Masanori Aritake, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 85 days.

(21) Appl. No.: 11/892,918

(22) Filed: Aug. 28, 2007

(65) Prior Publication Data

US 2008/0070006 A1    Mar. 20, 2008

(30) Foreign Application Priority Data

Aug. 30, 2006    (JP) ............................ P2006-234125
Aug. 30, 2006    (JP) ............................ P2006-234126

(51) Int. Cl.
*B32B 3/26* (2006.01)
*E06B 7/16* (2006.01)

(52) U.S. Cl. ...................... 428/122; 428/196; 49/490.1; 49/498.1

(58) Field of Classification Search ................. 428/122, 428/196; 49/490.1, 498.1
See application file for complete search history.

(56) References Cited

U.S. PATENT DOCUMENTS

| | | | |
|---|---|---|---|
| 3,604,153 A * | 9/1971 | Hess | ........................... 49/441 |
| 5,753,063 A | 5/1998 | Sakakibara et al. | |
| 6,110,546 A | 8/2000 | Honda et al. | |
| 6,896,954 B2 | 5/2005 | Omori et al. | |
| 2005/0186396 A1 | 8/2005 | Okajima et al. | |

FOREIGN PATENT DOCUMENTS

JP    2004-155237    6/2004

* cited by examiner

*Primary Examiner*—Alexander Thomas
(74) *Attorney, Agent, or Firm*—McGinn IP Law Group, PLLC

(57) ABSTRACT

A weather strip is mounted at the peripheral part of a door opening of a door for an automobile. The weather strip includes a sectionally nearly U-shaped trim part and a hollow seal part. A design lip is extended out from the trim part. A decoration layer of a non-woven fabric is formed on the design surface of the weather strip such as the outer surface of the design lip through a resin bonding layer of polyethylene (PE). The non-woven fabric constituting the decoration layer contains fibers subjected to "crimping processing" and has predetermined elasticity (stretch of 5 mm or more when load of 20 N is applied).

9 Claims, 4 Drawing Sheets

WEATHER STRIP AND METHOD FOR MANUFACTURING THE SAME

BACKGROUND OF THE INVENTION

1. Field of the Invention

This invention relates to a weather strip used at the peripheral part of a door opening of a vehicle such as an automobile and a method for manufacturing the same.

2. Description of the Related Art

Conventionally, by putting a non-woven fabric in place of a woven cloth on an interior member of a vehicle such as an automobile, it has been proposed to improve quality of exterior appearance and reduce the cost as compared with putting the woven cloth. An example of the interior member is a ceiling board within a vehicle compartment.

Further, a weather strip is put on the peripheral part of a door opening of the vehicle. The weather strip includes a sectionally nearly U-shaped trim part fit in the flange of the peripheral part of the door opening and a hollow seal part having a hollow shape provided so as to project from the trim part. When a door is closed, the seal part is brought into pressure-contact with the peripheral part of the door so that the space between the door and the body is sealed.

In recent years, it is proposed to put the non-woven fabric in place of the woven cloth on the design surface of the above weather strip as well as the interior member such as the ceiling board (for example, see JP-A-2004-155237).

However, setting aside the case where as in the ceiling board, the non-woven fabric is put on the board member previously fixed and the board member is mounted as it is, as in the weather strip, after the non-woven fabric is put and it is flexed or bent at the corner, it is attached in the flexed or bent state, the following inconveniences may occur. Specifically, in such a case, if the same non-woven fabric as when it is put on the ceiling board is put, a large number of bent creases S1 (for example, see FIG. 10) are produced at the area flexed or bent so that the quality of the exterior appearance may be deteriorated.

SUMMARY OF THE INVENTION

This invention has been accomplished in order to solve the above problem. An object of this invention is to provide a weather strip which can realize the excellent quality of the exterior appearance, equal to that with a woven cloth put on, make cost reduction and prevent deterioration in the quality of the exterior appearance due to bent creases at a corner, and a method for manufacturing such a weather strip.

An explanation will be given for aspects of the invention suitable to solve the above problem. As occasion demands, the advantage peculiar to the corresponding aspect will be added.

(1) A weather strip comprising:
a sectionally nearly U-shaped trim part held in a flange of the peripheral part of a door opening of a vehicle; and
a hollow seal part projected from the trim part and brought into pressure-contact with the peripheral part of the door when the door is closed, wherein a decoration layer of a non-woven fabric is formed on the outer surface of the trim part and the non-woven fabric contains fibers subjected to crimping processing.

In accordance with the above (1), since the decoration layer formed on the outer surface of the trim part is made of a non-woven fabric, it is given the same fabric mood as the case where a woven cloth is employed, thereby providing a beautiful external appearance and excellent feeling. On the other hand, since the non-woven fabric is employed, productivity is enhanced. Thus, the weather strip can be manufactured at low cost as compared with the case where the woven cloth is employed.

Generally, the weather strip is mounted in a state bent or flexed at the corner and others. However, the non-woven fabric in the aspect (1) of the invention contains the fibers subjected to crimping processing. For this reason, the weather strip can easily follow the pertinent deformation at the portion bent or flexed so that the bent creases are not prone to occur. As a result, it is possible to prevent the quality of the external appearance from being deteriorated owing to the bent creases.

(2) A weather strip according to the aspect (1) of the invention (1), further comprising a lip part extended out from the outer surface of the trim part, wherein a decoration layer of a non-woven fabric is formed on at least the outer surface of the lip part and the non-woven fabric contains fibers subjected to crimping processing.

In accordance with the aspect (2) of the invention, basically, the same advantage as the aspect (1) can be obtained.

(3) A weather strip according to the aspect (1) of the invention, wherein stretch of the decoration layer when load of 20 N is applied is 5 mm or more.

Now, the "stretch of the decoration layer when load of 20 N is applied" refers to the quantity of stretch when a pulling test at a pulling speed of 200 mm/minute is executed using a test sample of 3 cm by 25 cm at the time of the load of 20 N under the condition that the chuck-to-chuck distance is 100 mm. By using the decoration layer with the stretch of 5 mm or more when load of 20 N is applied, the advantage of preventing occurrence of the bent creases can be obtained more surely, as described in the above aspect (3). In contrast, if the decoration layer with the stretch less than 5 mm when load of 20 N is applied is employed, the bent creases may be generated.

(4) A weather strip according to the aspect (1) of the invention, wherein a sheet-like resin bonding layer intervening between the non-woven fabric and the outer surface of the trim part is formed on the decoration layer, the resin bonding layer being made of an olefinic thermoplastic resin.

In accordance with the aspect (4) of the invention, owing to intervention of the sheet-like bonding layer, unlike the case where the cloth is put using adhesive, it is possible to prevent inadvertent striped marks due to penetration of the adhesive from appearing on the decoration layer. Incidentally, the resin bonding layer may be previously put on the decoration layer, or may be caused to intervene immediately before the non-woven fabric is put.

Further, the resin bonding layer and decoration layer may be colored. In this case, black of e.g. EPDM rubber which is the material color of the weather strip body can be shielded. As a result, since the degree of shielding the material color is enhanced, from the viewpoint of hue, beautiful external appearance and excellent feeling can be obtained. In addition, if the resin bonding layer and decoration layer are colored in the same color, the degree of shielding the material color can be further enhanced.

(5) A weather strip according to the aspect (1) of the invention, further comprising a decoration layer of a non-woven fabric formed on the outer surface of the trim part, wherein the non-woven fabric has striped sewing marks or welding marks which are extended in a direction crossing at least the longitudinal direction of the weather strip.

In accordance with the above aspect (5) of the invention, since the decoration layer formed on the outer surface of the trim part is made of the non-woven fabric, it is given the same fabric mood as the case where a woven cloth is employed, thereby providing a beautiful external appearance and excellent feeling. On the other hand, since the non-woven fabric is employed, productivity is enhanced. Thus, the weather strip can be manufactured at low cost as compared with the case where the woven cloth is employed.

Generally, the weather strip is mounted in a state bent or flexed at the corner and others. However, the non-woven fabric in the aspect (5) has striped sewing marks or welding marks which are extended in a direction crossing at least the longitudinal direction of the weather strip. Therefore, the non-woven fabric is bent or flexed at an anchor point of each the striped sewing marks or welding marks so that the bent creases are not prone to occur and not conspicuous. As a result, it is possible to prevent the quality of the external appearance from being deteriorated owing to the bent creases.

(6) A weather strip according to the aspect (5) of the invention, further comprising a lip part extended from the outer surface of the trim part, wherein the decoration layer of the non-woven fabric is formed on also the outer surface of the lip part, and the non-woven fabric has striped sewing marks or welding marks which are extended in a direction crossing at least the longitudinal direction of the weather strip.

In accordance with the aspect (6), basically, the same advantage as the aspect (5) can be obtained.

(7) A weather strip according to the aspect (5) of the invention, wherein said sewing marks are in parallel to one another and a pitch of the sewing marks or welding marks is 3 mm or less.

(8) A weather strip according to the aspect (6), wherein said sewing marks are in parallel to one another and a pitch of the sewing marks or welding marks is 3 mm or less.

By using the decoration layer with the pitch of the sewing marks or welding marks being 3 mm or less, the advantage of making the above bent creases non-conspicuous can be obtained more surely, as described in the above aspects (7) and (8). Incidentally, the pitch is preferably 2 mm or less, and more preferably 1 mm or less.

(9) A weather strip according to the aspect (5) of the invention, wherein the sewing marks or welding marks are extended in a direction nearly orthogonal to at least the longitudinal direction of the weather strip.

As in the aspect (9), if the striped sewing marks or welding marks are extended in a direction nearly orthogonal to at least the longitudinal direction of the weather strip, they are seen as if they are the belly of a snake at the portion bent or flexed. Thus, the advantage that the bent creases can be made non-conspicuous can be obtained more surely.

(10) A weather strip according to the aspect (8) of the invention, wherein a sheet-like resin bonding layer intervening between the non-woven fabric and the outer surface of the trim part and/or the lip part is formed on the decoration layer, the resin bonding layer being made of an olefinic thermoplastic resin.

In accordance with the aspect (10), owing to intervention of the sheet-like bonding layer, unlike the case where the cloth is put using adhesive, it is possible to prevent inadvertent striped marks due to penetration of the adhesive from appearing on the decoration layer. Incidentally, the resin bonding layer may be previously put on the decoration layer, or may be caused to intervene immediately before the non-woven fabric is put.

Further, the resin bonding layer and decoration layer may be colored. In this case, black of e.g. EPDM rubber which is the material color of the weather strip body can be shielded. As a result, since the degree of shielding the material color is enhanced, from the viewpoint of hue, beautiful external appearance and excellent feeling can be obtained. In addition, if the resin bonding layer and decoration layer are colored in the same color, the degree of shielding the material color can be further enhanced.

(11) A method for manufacturing a weather strip set forth in the aspect (1) of the invention comprising:

an extrusion molding step of extruding a sectionally nearly U-shaped trim part and/or a lip part projecting from the trim part using non-cured EPDM solid rubber and extruding a hollow seal part provided on the side of the trip part using non-cured EPDM sponge rubber, the trim part and/or lip part and the seal part constituting the weather strip;

a curing step of curing the non-cured EPDM solid rubber and non-cured EPDM sponge rubber; and a decoration layer forming step of bringing, through an olefinic thermoplastic resin sheet, a non-woven fabric containing fibers subjected to crimping processing into pressure-contact with the trim part and/or the lip of the cured EPDM solid rubber and forming a decoration layer of the non-woven fabric by thermal welding of the sheet.

In accordance with the above aspect (11), basically, the same advantage as the above aspect (1) can be obtained. In addition, in the aspect (11), since the decoration layer is wholly put by thermal welding of olefinic thermoplastic resin sheet, the step of applying adhesive is not required. Further, if the thermal welding is executed immediately after the curing step in which the rubber portion reaches a high temperature, a heating step for thermal welding is not required separately. As a result, forming the decoration layer, i.e. putting the non-woven fabric can be done relatively easily. This contributes to improvement of the productivity and production at low cost. Incidentally, the resin bonding layer may be previously put on the non-woven fabric, or may be supplied to intervene between the rubber and non-woven fabric immediately after the curing step and immediately before the non-woven fabric is brought into pressure-contact.

(12) A method for manufacturing a weather strip according to the aspect (11), wherein the non-woven fabric is subjected to sewing processing or welding processing in its preparing step.

In accordance with the aspect (12), basically, the same advantage as the aspect (11) can be obtained.

DETAILED DESCRIPTION OF THE PREFERRED EMBODIMENTS

Figure 1:
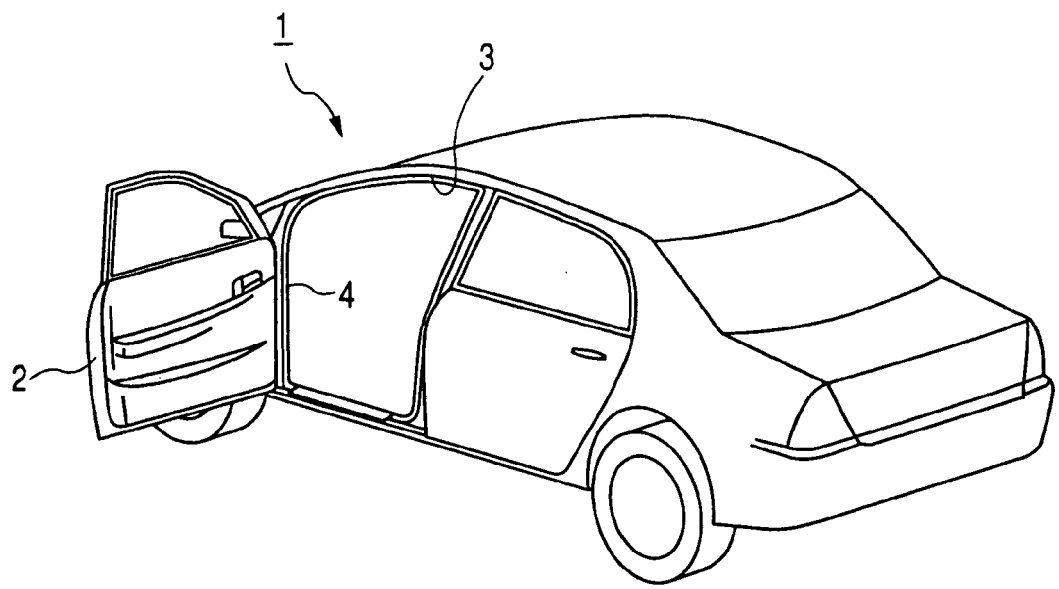
FIG. 1 is a perspective view of an automobile.

Now referring to the drawings, an embodiment will be explained below. As seen from FIG. 1, a door 2 is provided openably on the side of an automobile 1 as a vehicle. A weather strip 4 is mounted on the peripheral part of a door opening 3 on the body side corresponding to the door 2. The weather strip 4 according to this embodiment is molded by mainly extrusion and ring-shape as a whole.

Figure 2:
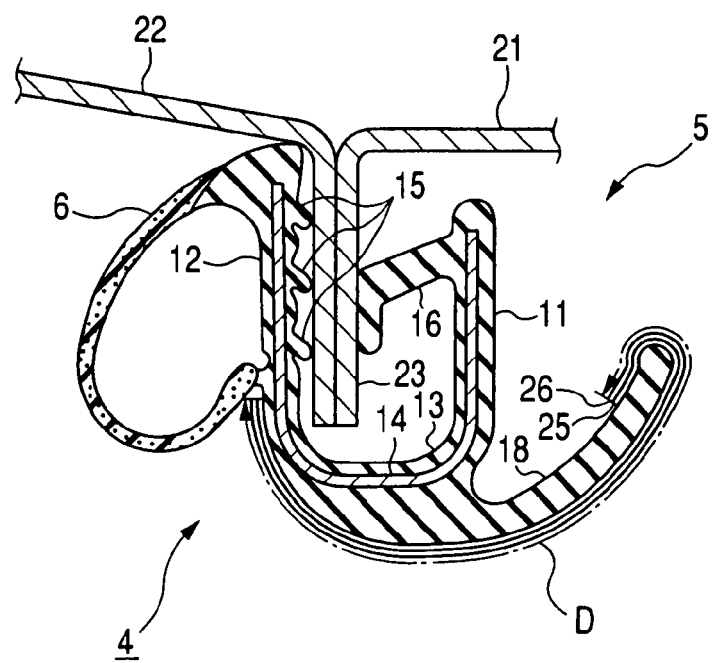
FIG. 2 is a sectional view showing a weather strip according to an embodiment.

As seen from FIG. 2, the weather strip 4 includes a trim part 5 and a seal part 6. The trim part 5 is composed of a vehicle interior side wall 11, a vehicle exterior side wall 12 and a coupling portion 13 coupling both side walls 11, 12, and is sectionally nearly U-shaped as a whole. The trim part 5 is made of EPDM (ethylene-propylene-diene copolymer) solid rubber. On the inside thereof, a metallic insert 14 is embedded.

On the inner face (vehicle-interior face) of the vehicle exterior side wall 12, a plurality of holding lips 15 which extend toward the inside of the trim part 5 (vehicle-interior) are integrally formed. On the inner face (vehicle-exterior face) of the vehicle interior side wall 11, a holding lip 16 which extends toward the inside of the trim part 5 (vehicle-exterior) is integrally formed. From the coupling portion 13, a design lip 18 is extended which covers the end of the interior member such as a garnish not shown. The design lip 18 corresponds to the lip part in this embodiment. Incidentally, the insert may not be embedded internally. Further, the holding lips may be omitted so that both side walls are put on a flange by a double-faced tape.

At the peripheral part of the door opening 3, a flange 23 is formed in such a manner an inner panel 21 and outer panel 22 of the above body are bonded. The trim part 5 is fit on the flange 23 so that the weather strip 4 is held on the peripheral part of the door opening 3.

On the other hand, the seal part 6 is integrally projected on the vehicle-exterior of the vehicle exterior side wall 12. The seal part 6 is made of EPDM sponge rubber to form a hollow shape. When the door 2 is closed, the seal part 6 is brought into pressure-contact with the peripheral part of the door 2 so that the space between the door 2 and the body of the automobile 1 is sealed.

In the state where the weather strip 4 is attached, the outer surface in the range from the tip of the design lip 18 to the base thereof and further to the area in the coupling portion 13 and vehicle exterior side wall 12 of the trim part 5 connected to the seal part 6 serves as a design surface D which appears on the exterior appearance. As seen from a partially enlarged sectional view of FIG. 4, on the design surface D, a decoration layer 26 of a non-woven fabric is formed through a sheet-like (inclusive of film) resin bonding layer 25. Incidentally, as seen from FIGS. 2 and 3, the design surface D has the non-woven fabric put to the tip of the design lip 18 and includes a folded portion.

The resin bonding layer 25 in this embodiment is made of polyethylene (PE) which is an olefinic thermoplastic resin. The resin bonding layer 25 is colored in white. It is needless to say that the resin bonding layer 25 is may be colored in not white but any color (e.g. red, blue or green) according to the interior member such as the garnish. Incidentally, where an indoor interior member is blackish, the coloring of the resin bonding layer 25 may be adjusted by addition of black paints so as to match the color or gloss of the indoor interior member. The coloring may be omitted.

Further, the decoration layer 26 in this embodiment is made of a non-woven fabric of a polyester fiber such as polyethylene terephthalate (PET). This non-woven fabric may be made of not polyester such as PET but the other thermoplastic resin material such as PE or polypropylene (PP). The non-woven fabric can be manufactured by any manufacturing method such as wet technique, dry technique or jetting technique. The fibers of the non-woven fabric must be subjected to "crimping processing". Now, the "crimping processing" refers to various kinds of processing performed for the fiber to generally give bulkiness and elasticity to the cloth so that the fiber has a shape as it is wound in the shrunken state. Thus, the fiber is given elasticity. The processing technique may be various kinds of "crimping processing" such as "false-twisting processing" or "bulky yarn processing" (an extended staple and a normal staple are mixed and heat-treated to give a difference in shrinkage between both staples, thereby giving bulkiness).

The non-woven fabric containing the fiber subjected to the "crimping processing" provides predetermined elasticity. In particular, in this embodiment, the elasticity is set so that the stretch when load of 20 N is applied is 5 mm or more. Now, the "stretch when load of 20 N is applied" refers to the quantity of stretch at the time of the load of 20 N when a pulling test is executed at a pulling speed of 200 mm/minute using a test sample of 3 cm by 25 cm under the condition that the chuck-to-chuck distance is 100 mm. It should be noted that the decoration layer 26, like the above resin bonding layer 25, is also colored in the color matching the color of the indoor interior member.

An example of the non-woven fabric is as follows. The concrete physical properties thereof are density of 118 (g/square meter), thickness of 0.7 mm and quantity of stretch of 41.1 mm (lengthwise) and 67.1 mm (widthwise) at the time of the load of 20 N.

Figure 5:
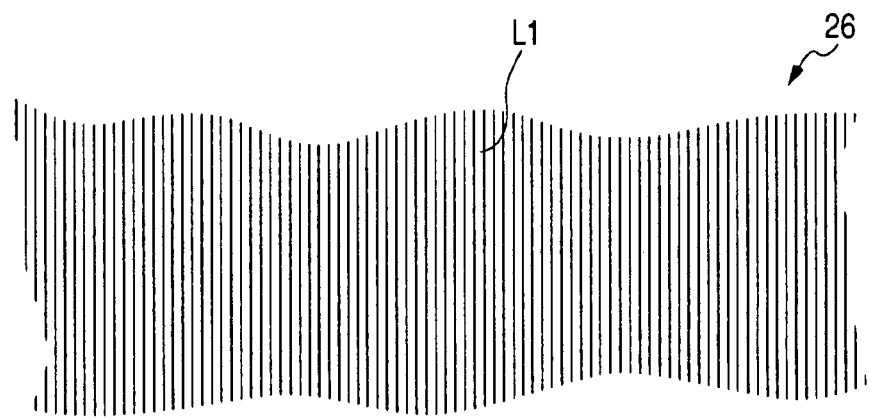
FIG. 5 is a plan view schematically showing a non-woven fabric (decoration layer).

The non-woven fabric (decoration layer 26) in this embodiment, as seen from FIG. 5, is sewed so that striped sewing marks L1 are extended in parallel at regular intervals in a direction nearly orthogonal to the longitudinal direction of the weather strip 4. The pitch of the sewing marks L1 in this embodiment is set at 3 mm or less, preferably 2 mm or less or more preferably 1 mm or less. It should be noted that the decoration layer 26, like the above resin bonding layer 25, is also colored in the color matching the color of the indoor interior member.

Figure 6:
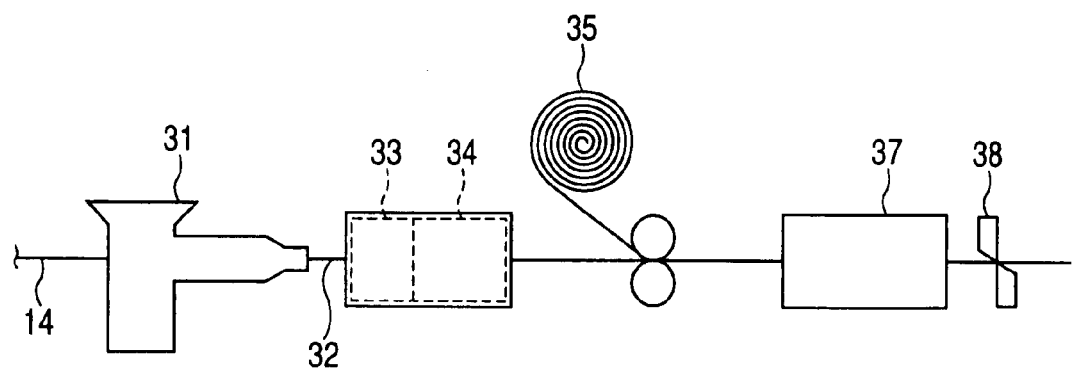
FIG. 6 is a schematic view showing a part of a manufacturing line of the weather strip.

Next, an explanation will be given of the method for manufacturing the above weather strip 4. FIG. 6 is a schematic view showing a part of a manufacturing line of the weather strip 4. In this figure, the weather strip 4 will be manufactured while it moves toward right from left.

Figure 3:
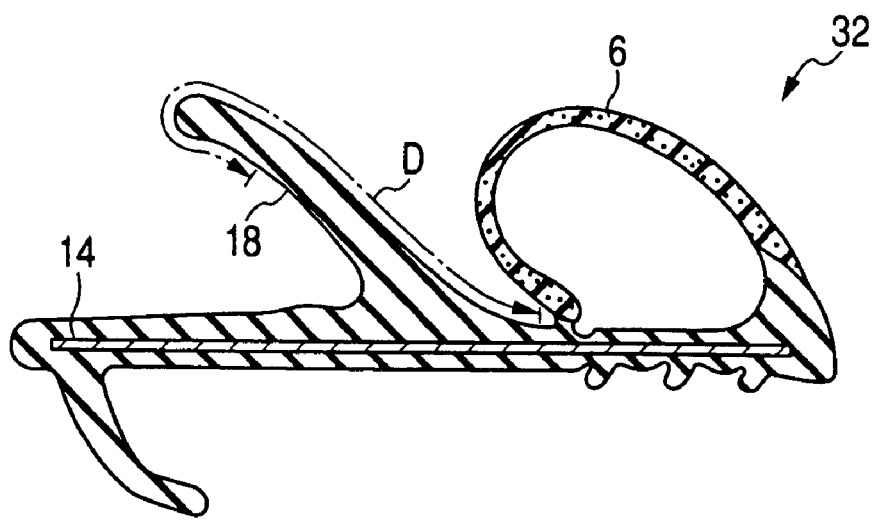
FIG. 3 is a sectional view showing an intermediate mold of the weather strip.
Figure 4:
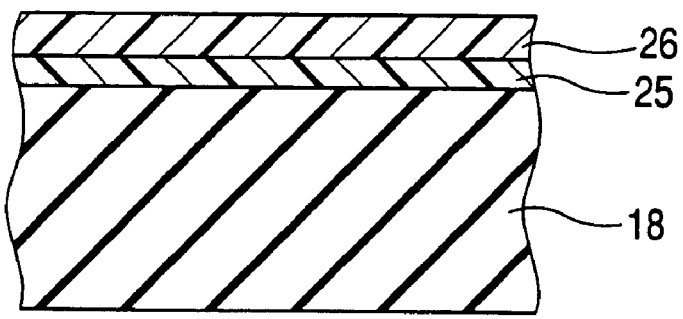
FIG. 4 is a partially enlarged sectional view for explaining a resin bent layer and a decorating layer.

First, in an extrusion molding step, an insert 14 as well as EPDM non-cured rubber is continuously supplied to a rubber extruder 31. With the insert 14 being covered with the EPDM non-cured rubber, an intermediate mold 32 (see FIG. 3) serving as a body of the weather strip 4 is extruded from a dice of the rubber extruder 31. In this step, the portion with the insert 14 embedded therein corresponding to the trim part 5 is extruded in nearly plane-like shape in a state opened as shown in FIG. 3.

Next, in a curing step, the intermediate mold 32 thus extruded is guided to a high-frequency bath (UHF) 33 and primarily cured there. Thereafter, the mold is guided to a hot wind curing bath (HAV) 34 and secondarily cured there. Thus, the curing step is completed.

Thereafter, in a decoration layer forming step, the decoration layer 26 is formed on the intermediate mold 32. More specifically, a laminate non-woven fabric 35 in which the non-woven fabric of polyester fibers are coated with a PE sheet by thermal welding is sent out so that it is brought into pressure-contact with the area corresponding to the design surface D of the intermediate mold 32 which has reached a relatively high temperature immediately after the curing. Thus, the PE sheet is molten so that the above laminate non-woven fabric 35 is thermally welded onto the intermediate mold 32. The thickness of both the PE sheet and non-woven fabric is about 0.5 to 1 mm so that the thickness of the laminate non-woven fabric 35 is about 1 to 2 mm.

The intermediate mold 32 having experienced the decoration layer forming step is bent by a bending processor 37 thereby to form the sectionally nearly U-shaped trim part 5. Thereafter, the intermediate mold 32 is cut in a predetermined size by a cutter 38, thereby providing the weather strip 4.

As described in detail, since the decoration layer 26 formed on the design surface D of the weather strip 4, such as the outer surface of the design lip 18, is made of the non-woven fabric of polyester fibers, it can be given the same fabric external appearance as when the woven cloth is used, thereby providing a beautiful external appearance and excellent feeling. On the other hand, since the non-woven fabric with high productivity is employed, the weather strip 4 can be manufactured at low cost.

Figure 8:
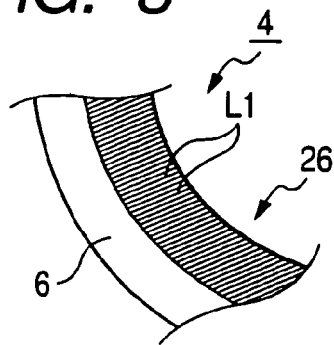
FIG. 8 is a schematic view for explaining the advantage of this embodiment.

Generally, the weather strip 4 is mounted in a state bent or flexed at the corner of the door opening. However, the non-woven fabric constituting the decoration layer 26 in this embodiment contains the fibers subjected to "crimping processing". For this reason, the weather strip can easily follow the pertinent deformation at the portion bent or flexed so that the bent creases are not prone to occur (for example, see FIG. 8). As a result, it is possible to prevent the quality of the external appearance from being deteriorated owing to the bent creases. Particularly, in accordance with this embodiment, since the stretch of the decoration layer 26 when load of 20 N is applied is 5 mm or more, the above advantage can be obtained more surely.

Figure 7A:
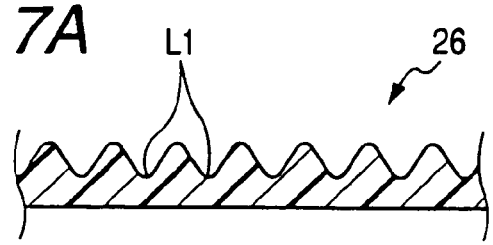
FIG. 7A is a sectional view schematically showing a sheet-like non-woven fabric (decoration layer).
Figure 7B:
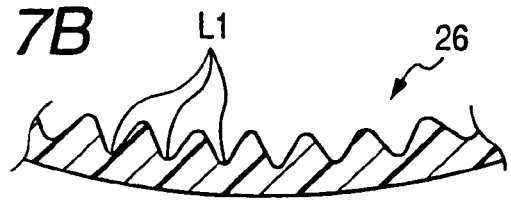
FIG. 7B is a sectional view schematically showing the state bent or flexed from the state of FIG. 7A.

Further, the non-woven fabric constituting the decoration layer 26 in this embodiment of the weather strip 4 is sewed so that striped sewing marks L1 are extended in parallel at regular intervals in a direction nearly orthogonal to the longitudinal direction of the weather strip 4. Therefore, as seen from FIGS. 7A, 7B and 8, the decoration layer 26 is bent or flexed at an anchor point of each the stripe sewing marks L1 so that the bent creases are not prone to occur and not conspicuous. As a result, it is possible to prevent the quality of the external appearance from being deteriorated owing to the bent creases. Particularly, in this embodiment, since the pitch of the sewing marks L1 is relatively fine as long as 3 mm or less, the above advantage can be obtained more surely. Further, the striped sewing marks L1 are extended not diagonally but in a direction nearly orthogonal to the longitudinal direction of the weather strip 4. So, they are seen as if they are the belly of a snake at the portion bent or flexed. Thus, the advantage that the bent creases can be made non-conspicuous can be obtained more surely.

Further, in this embodiment, the laminate non-woven fabric 35 coated with the PE sheet is brought into pressure-contact with the intermediate mold 32 and thermally welded thereon. For this reason, the step of applying adhesive is not required. Since the non-woven fabric 35 is brought into pressure-contact with the intermediate mold 32 which has reached a relatively high temperature immediately after curing, a heating step for thermal welding is not required separately. As a result, forming the decoration layer, i.e. putting the non-woven fabric can be done relatively easily. From this view point also, improvement of the productivity and the production at low cost can be realized.

Further, owing to intervention of the sheet-like bonding layer 25, unlike the case where the cloth is put using adhesive, inadvertent striped marks due to penetration of the adhesive will not appear on the decoration layer 26. Incidentally, the resin bonding layer 25 may be previously coated as described above, but may be supplied to intervene immediately before the non-woven fabric is put.

Furthermore, in this embodiment, the resin bonding layer 25 and the decoration layer 26 are colored so that black which is a material color of EPDM rubber can be shielded. As a result, since the degree of shielding the material color is enhanced, from the viewpoint of hue, beautiful external appearance and excellent feeling can be obtained. In addition, since the resin bonding layer 25 and decoration layer 26 are colored in the same color, the degree of shielding the material color can be further enhanced. Further, since the non-woven fabric of synthetic resin is employed, color development in coloring is excellent as compared with the case where the decoration layer is made of elastomer.

Additionally, without being limited to the description relative to the above embodiment, for example, the following changes can be made. It is needless to say that other applications and changes not described in the following can be done.

(a) In this embodiment, the weather strip 4 which is provided at the peripheral part of the door opening 3 of the body side corresponding to the (side front) door 2 was embodied. However, this invention can be applied to the weather strip provided on the peripheral part of the door opening of the other door such as a rear door, back door, luggage door (trunk lid) or roof door (sliding roof panel).

(b) In the weather strip in which the design lip 18 is omitted and the outer surface of the trim part 5 serves as a design surface, the resin bonding layer 25 and decoration layer 26 may be formed on the surface of the trim part 5.

(c) In the embodiment described above, although the weather strip 4 is made of EPDM, it may be made of the other rubber material such as IR (isoprene rubber) or CR (chloroprene rubber).

(d) In the embodiment described above, the resin bonding layer 25 is made of PE, it may be made of the other resin material such as PP. The resin bonding layer 25 may be omitted, and in place of it, adhesive may be used.

(e) In the embodiment described above, although the weather strip 4 is attached on the entire peripheral part of the door opening 3, but it may be attached partially on the peripheral part thereof. Further, a molded portion may be partially provided.

(f) The content of fibers subjected to "crimping processing" preferably ranges from 20 % (inclusive) to 100% (inclusive), more preferably ranges from 40% (inclusive) to 100% (inclusive), and further preferably ranges from 60% (inclusive) to 100% (inclusive).

Figure 9:
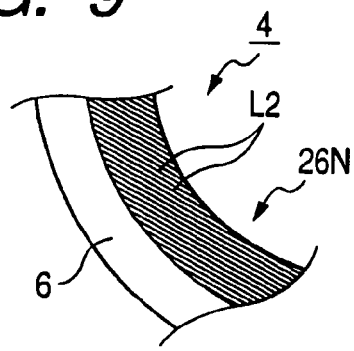
FIG. 9 is a schematic view of another embodiment.
Figure 10:
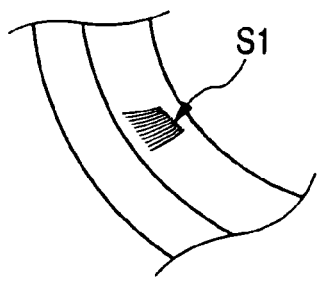
FIG. 10 is a schematic view for explaining conventional bent creases.

(g) In the embodiment described above, the sewing marks L1 are extended in a direction nearly orthogonal to the longitudinal direction of the weather strip 4. However, as shown in FIG. 9, another decoration layer 26N may be adopted in which striped sewing marks L2 are extended in a direction diagonally crossing the longitudinal direction of the weather strip 4.

(h) In the embodiment described above, the non-woven fabric (decoration layer 26) has the striped sewing marks L1. However, it may be not necessarily sewed. For example, the non-woven fabric (decoration layer) with welding marks formed by welding may be provided.

(i) In this embodiment, the weather strip 4 which is provided on the peripheral part of the door opening 3 of the body side corresponding to the (side front) door 2 was embodied. However, this invention can be applied to the weather strip provided on the peripheral part of the door opening of the other door such as a rear door, back door, luggage door (trunk lid) or roof door (sliding roof panel).

(j) In the weather strip in which the design lip 18 is omitted and the outer surface of the trim part 5 serves as a design surface, the resin bonding layer 25 and decoration layer 26 may be formed on the surface of the trim part 5.

What is claimed is:

1. A weather strip comprising:
    a sectionally nearly U-shaped trim part held in a flange of a peripheral part of a door opening of a vehicle; and
    a hollow seal part projected from said trim part and brought into contact with a peripheral part of the door when the door is closed,
    wherein a decoration layer of a non-woven fabric is formed on an outer surface of said trim part and said non-woven fabric comprises fibers subjected to a crimping processing,
    wherein a stretch of said decoration layer when a load of 20 N is applied is 5 mm or more.

2. A weather strip according to claim 1, further comprising a lip part extended out from the outer surface of said trim part, wherein a decoration layer of a non-woven fabric is formed on at least the outer surface of said lip part and said non-woven fabric contains fibers subjected to the crimping processing.

3. A weather strip according to claim 1, wherein a sheet-like resin bonding layer intervening between said non-woven fabric and said outer surface of said trim part is formed on said decoration layer, said resin bonding layer comprising an olefinic thermoplastic resin.

4. A weather strip comprising:
    a sectionally nearly U-shaped trim part held in a flange of a peripheral part of a door opening of a vehicle; and
    a hollow seal part projected from said trim part and brought into contact with a peripheral part of the door when the door is closed,
    wherein a decoration layer of a non-woven fabric is formed on an outer surface of said trim part and said non-woven fabric comprises fibers subjected to a crimping processing, and
    wherein said non-woven fabric has striped sewing marks or welding marks which are extended in a direction crossing at least the longitudinal direction of said weather strip.

5. A weather strip according to claim 4, further comprising a lip part extended out from the outer surface of said trim part,
    wherein the decoration layer of the non-woven fabric is disposed on the outer surface of said lip part, and
    wherein said non-woven fabric has striped sewing marks or welding marks which are extended in a direction crossing at least the longitudinal direction of said weather strip.

6. A weather strip according to claim 5, wherein said sewing marks or welding marks are in parallel to one another and a pitch of said sewing marks or welding marks is 3 mm or less.

7. A weather strip according to claim 6, wherein a sheet-like resin bonding layer intervening between said non-woven fabric and said outer surface of at least one of said trim part and said lip part is disposed on said decoration layer, said resin bonding layer comprising an olefinic thermoplastic resin.

8. A weather strip according to claim 4, wherein said sewing marks or welding marks are in parallel to one another and a pitch of said sewing marks or welding marks is 3 mm or less.

9. A weather strip according to claim 4, wherein said sewing marks or welding marks are extended in a direction nearly orthogonal to at least the longitudinal direction of the weather strip.

\* \* \* \* \*